US008449396B2

(12) United States Patent
Craine et al.

(10) Patent No.: US 8,449,396 B2
(45) Date of Patent: May 28, 2013

(54) FINDING FRIENDS FOR MULTIUSER ONLINE GAMES

(75) Inventors: Darren Ryan Craine, Moraga, CA (US); Justin Potter Driemeyer, Burlingame, CA (US); Kevin Thomas Hagan, Los Gatos, CA (US); Jason Samuel McGuirk, San Mateo, CA (US); Matthew Adam Ocko, Palo Alto, CA (US); Shane Ishmaei Sareli, San Francisco, CA (US); Nicholas John Tornow, San Jose, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/244,759

(22) Filed: Sep. 26, 2011

(65) Prior Publication Data

US 2012/0015739 A1    Jan. 19, 2012

Related U.S. Application Data

(63) Continuation of application No. 12/892,789, filed on Sep. 28, 2010.

(60) Provisional application No. 61/247,554, filed on Sep. 30, 2009.

(51) Int. Cl.
*A63F 13/12* (2006.01)

(52) U.S. Cl.
USPC ........ 463/42; 463/9; 463/29; 463/40; 463/43; 709/202; 709/203; 709/204; 709/205; 709/206

(58) Field of Classification Search
USPC .................... 463/9, 29, 39–43; 709/202–206, 709/224
See application file for complete search history.

(56) References Cited

U.S. PATENT DOCUMENTS

| 6,755,743 | B1 | 6/2004 | Yamashita et al. |
|---|---|---|---|
| 7,240,093 | B1 | 7/2007 | Danieli et al. |
| 2004/0192440 | A1 | 9/2004 | Evans et al. |
| 2004/0224772 | A1* | 11/2004 | Canessa et al. ................ 463/42 |
| 2012/0015737 | A1 | 1/2012 | Craine et al. |
| 2012/0015741 | A1 | 1/2012 | Craine et al. |

OTHER PUBLICATIONS

"U.S. Appl. No. 12/892,789, Non Final Office Action mailed Mar. 2, 2012", 8 pgs.
"U.S. Appl. No. 13/244,747, Non Final Office Action mailed Feb. 13, 2012", 9 pgs.
"U.S. Appl. No. 13/244,770, Non Final Office Action mailed Feb. 1, 2012", 10 pgs.
"U.S. Appl. No. 12/892,789, Final Office Action mailed Jul. 30, 2012", 8 pgs.
"U.S. Appl. No. 13/244,747, Notice of Allowance mailed Jul. 16, 2012", 12 pgs.
"U.S. Appl. No. 13/244,770. Response filed Sep. 26, 2012 to Final Office Action mailed Jun. 29, 2012", 11 pgs.

* cited by examiner

*Primary Examiner* — Sunit Pandya
(74) *Attorney, Agent, or Firm* — Schwegman, Lundberg & Woessner, P.A.

(57) ABSTRACT

The present disclosure relates to games and applications in general and in particular to computer-implemented online games, such as online role-playing games, playable by more than one person from more than one location. The game engine can search a player's social network to find friends to play with. These social networks can be constructed implicitly by analyzing a player's game play information and other information.

22 Claims, 7 Drawing Sheets

FIG. 4

FINDING FRIENDS FOR MULTIUSER ONLINE GAMES

CLAIM OF PRIORITY

This application is a continuation of and claims the benefit of priority under 35 U.S.C. §120 to U.S. patent application Ser. No. 12/892,789, filed on Sep. 28, 2010, which claims the benefit of priority under 35 U.S.C. §119(e) to U.S. Provisional Patent Application Ser. No. 61/247,554, filed on Sep. 30, 2009, the benefit of priority of each of which is claimed hereby, and each of which are incorporated by reference herein in its entirety.

TECHNICAL FIELD

The present disclosure relates to games and applications in general and in particular to computer-implemented online games, such as online role-playing games (RPGs), playable by more than one person from more than one location.

BACKGROUND

In many games, there is a virtual world or some other imagined playing space and a player of the game controls one or more player characters (herein "character," "player character," or "PC"). Player characters can be considered in-game representations of the controlling player; as such, all uses of the terms "player," "user," "entity," and "friend" refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

An electronic social networking system typically operates with a social networking server or servers providing interaction between users such that a user can specify other users of the social networking system as "friends." As should be apparent, a collection of users and the "friend" connections between users can form a social graph that can be traversed to find second, third and more remote connections between users, much like a graph of nodes connected by edges can be traversed.

Certain online gaming systems allow for users, using suitable user devices (computers, consoles, etc.) networked to each other, directly or indirectly, to play games with or against other users. Some games have features to assist users in forming a group around specific content such as World of Warcraft's™ "Looking for Group" (LFG) and "Looking for More" (LFM) features for grouping users around specific content, e.g., a specific game instance or game zone.

BRIEF DESCRIPTION OF THE DRAWINGS

FIG. 4 shows an example of Zynga Poker and the Zynga Live feature.

DESCRIPTION OF EXAMPLE EMBODIMENTS

Figure 1:
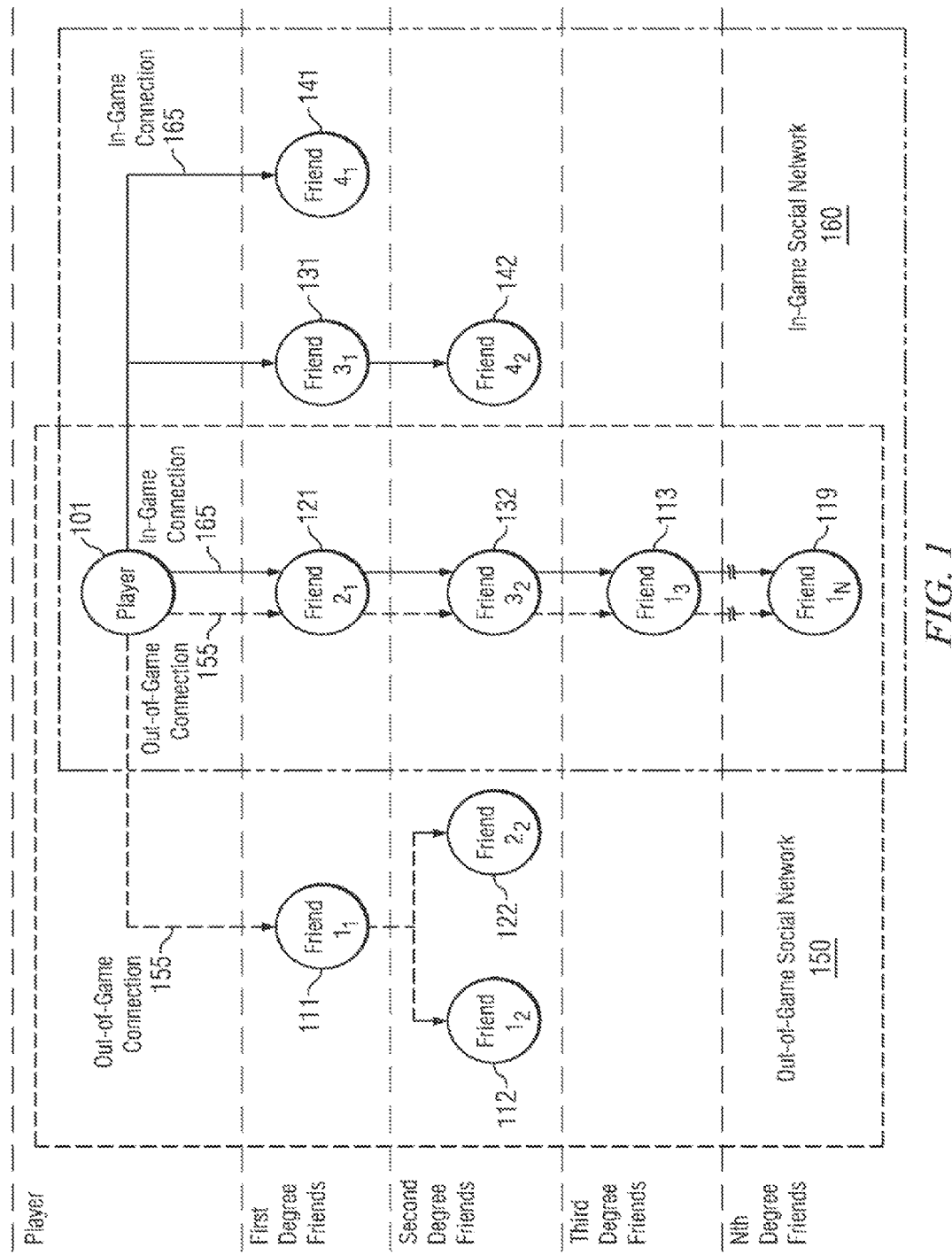
FIG. 1 depicts a schematic of an in-game social network and an out-of-game social network.

Game Systems, Social Networks, and Social Graphs

In an online multiplayer game, players control player characters (PCs), a game engine controls non-player characters (NPCs) and game features, and the game engine also manages player character state and tracks state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. The game engine uses player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character.

A game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. The social graph has a node for each entity, and edges to represent relationships between entities. A node in a social graph can represent any entity. The present disclosure assumes that at least one entity of a social graph is a player or player character in an online multiplayer game, though the present disclosure is intended to cover all types of social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by either the social networking system 520a or the game system 520b. In one embodiment, $N_{max}$ equals 1, such that the player's social network includes only first-degree friends. In another embodiment, $N_{max}$ is unlimited and the player's social network is coextensive with the social graph.

In one embodiment, the social graph is managed by the game networking system 520b managed by the game operator. In another embodiment, the social graph is part of a social networking system 520a managed by a third-party (e.g., Facebook, Friendster, Myspace, etc.). In yet another embodiment, a player has a social network on both the game networking system 520b and the social networking system 520a, wherein the player can have a social network on the game networking system 520b that is a subset, superset, or independent of the player's social network on the social networking system 520a. In such combined systems, the game network system 520b can maintain social graph information with edge type attributes that indicate whether a given friend is an "in-game friend," a "social network friend," or both. The various embodiments disclosed herein are operable when the social graph is managed by a social networking system 520a, a game networking system 520b, or both.

Out-of-Game and In-Game Social Networks

FIG. 1 shows an example of an out-of-game social network 150 within a social graph. As shown, Player 101 can be associated, connected or linked to various other users, or "friends," within the social network 150. These associations, connections or links can track relationships between users within the social network 150 and are commonly referred to as online "friends" or "friendships" between users. Each friend or friendship in a particular user's social network within a social graph is commonly referred to as a "node." The details of social network 150 will be described in relation to an original, first, or primary player, e.g., Player 101. As used herein, the terms "player" and "user" can be used interchangeably and can refer to any user or character in an online multiuser game system or social networking system. As used herein, the term "friend" means any node within a player's social network.

As shown in FIG. 1, Player 101 has direct connections with several friends. When Player 101 has a direct connection with another individual that connection is referred to as a first-degree friend. In social network 150, Player 101 has two first-degree friends. That is, Player 101 is directly connected to Friend $1_1$ 111 and Friend $2_1$ 121. In a social graph, it is possible for individuals to be connected to other individuals through their first-degree friends (i.e., friends of friends). As described above, each edge required to connect a player to another user is considered the degree of separation. For example, FIG. 1 shows that Player 101 has three second-degree friends to which he is connected via his connection to his first-degree friends. Second-degree Friend $1_2$ 112 and Friend $2_2$ 122 are connected to Player 101 via his first-degree Friend $1_1$ 111. The limit on the depth of friend connections, or the number of degrees of separation for associations, that Player 101 is allowed is typically dictated by the restrictions and policies implemented by social networking system 520a.

In various embodiments, Player 101 can have Nth-degree friends connected to him through a chain of intermediary degree friends as indicated in FIG. 1. For example, Player 101 also has 3rd-degree (e.g., Friend $1_3$ 113), and Nth-degree (e.g., Friend $1_N$ 119) friends. Various embodiments of the present invention may take advantage of and utilize the distinction between the various degrees of friendship relative to Player 101.

Connections between Player 101 and other entities in the social graph can be built in several ways. In some embodiments, Player 101 can invite various entities into his first-degree level friends category within the infrastructure of a social network website or other server. In other embodiments, Player 101 can invite entities to join a social graph or network from within an online multiplayer game. In yet other embodiments, Player 101 can invite anyone from his out-of-game social network 150 to join an in-game social network 160 within a separate or connected online multiuser game.

In various embodiments, a player (or player character) can have a social graph within an online multiplayer game that is maintained by the game engine and another social graph maintained by a separate social networking system. FIG. 1 depicts a schematic example of an in-game social network 160 and an out-of-game social network 150. In this example, Player 101 has out-of-game connections 155 to a plurality of friends, forming an out-of-game social network 150. Here, Friend $1_1$ 111 and Friend $2_1$ 121 are first-degree friends with Player 101 in his out-of-game social network 150. Player 101 also has in-game connections 165 to a plurality of players, forming an in-game social network 160. Here, Friend $2_1$ 121, Friend $3_1$ 131, and Friend $4_1$ 141 are first-degree friends with Player 101 in his in-game social network 160. In some embodiments, it is possible for a friend to be in both the out-of-game social network 150 and the in-game social network 160. Here, Friend $2_1$ 121 has both an out-of-game connection 155 and an in-game connection 165 with Player 101, such that Friend $2_1$ 121 is in both Player 101's in-game social network 160 and Player 101's out-of-game social network 150.

As with other social networks, Player 101 can have second-degree and higher-degree friends in both his in-game and out of game social networks. In some embodiments, it is possible for Player 101 to have a friend connected to him both in his in-game and out-of-game social networks, wherein the friend is at different degrees of separation in each network. For example, if Friend $2_2$ 122 had a direct in-game connection with Player 101, Friend $2_2$ 122 would be a second-degree friend in Player 101's out-of-game social network, but a first-degree friend in Player 101's in-game social network.

A multiuser online game can access both in-game social networks 160 and out-of-game social networks 150, and the embodiments disclosed herein are operable using either or both.

Implicit and Explicit Friend Connection

In various embodiments, the connections in a player's in-game social network can be formed both explicitly (e.g., users must "friend" each other) and implicitly (e.g., system observes user behaviors and "friends" users to each other).

The connection may be explicit when a first user and a second user indicate to the social networking system that the system should establish an edge between their nodes in the social graph. For example, Player 101 can access another player's social network webpage and click "Add as Friend" to establish a friend connection. If the other player accepts the friend invitation, the system will record a connection between them on the social graph, thereby expanding the social networks of both players. Both in-game connections 165 and out-of-game connections 155 can be formed explicitly.

In various embodiments, the connection can be formed implicitly when the social networking system 520a or the game system 520b determines that a relationship exists between to players.

some embodiments, a multiuser online game may analyze player behavior (which may be synchronous or asynchronous in nature, including interactions that may be widely separated in time) and infer friend connections therefrom. For example, if Player 101 and Friend $3_1$ 131 have played Zynga Poker together (e.g., at the same virtual poker table) for a sufficient period (e.g., twice ever, twice in a month, twice in two days, etc.), the game engine may record the existence of a presumed or implied friend connection between Player 101 and Friend $3_1$ 131, even if there is no explicit or express friend connection in the social graph.

In some embodiments, in-game friend connections can be determined by referencing an out-of-game social network 150. For example, if Player 101 and Friend $2_1$ 121 are friends on out-of-game social network 150 (e.g., Facebook), the game engine may presume a friend connection between them and create an in-game connection 165 in their respective in-game social networks 160. In some embodiments, a player's in-game social network 160 may comprise the player's entire out-of-game social network 150 and further comprise additional in-game connections formed explicitly or implicitly. The game system 520b may be able to supplement a player's out-of-network social network 150 by forming out-of-game connections 155 that are implied from game play history. For example, if Player 101 and Friend $4_1$ 141 have played Zynga Poker six times together in the past week but not bothered to "friend" each other either within the game or within any out-of-game social networks (e.g., Facebook), the game engine may prompt these players to add each other as friends on their out-of-game social networks 150, or may even automatically create a friend connection between them on the out-of-game social graph.

Similarly, friend connections can be formed programmatically based a player's social network information (e.g., friend connections may be implied between all players in the same geographic area, in the same company, or in the same school).

In various embodiments, the game system 520b may weight different factors differently when determining whether to form an implicit friend connection. For example, the game engine may only imply an in-game connection 165 between two players when their "friend factor" exceeds a value of 1.0, where a bidirectional out-of-game connection between two users has a value of 0.7, a unidirectional out-of-game connection has a value of 0.4, and each instance played together has a value of 0.2. Formation of the in-game social network 160 may be aided by a rating system that allows players to provide feedback about other players that they have played with. Continuing the example above, giving another player a positive review has a value of 0.3, while giving that player a negative review has a value of −0.4.

In some embodiments, the in-game social network 160 may be substantially constructed based on prior play experience. That is to say, people with whom the first user played previously and more frequently become that user's friends over time in the view of the game system.

Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Finding Friends for Gaming

Finding Friends for a New Instance

Figure 2:
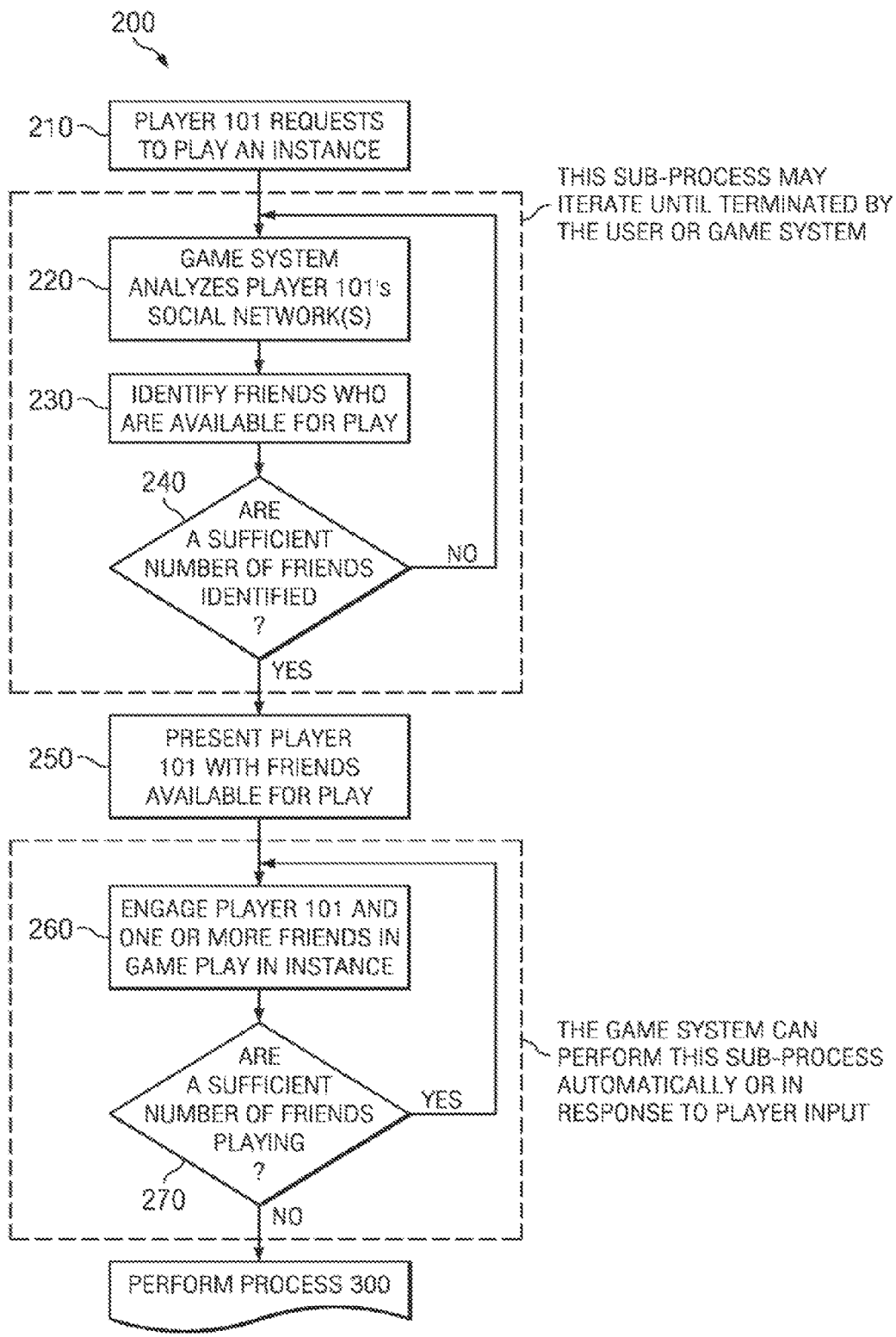
FIG. 2 shows a flowchart illustrating an example process for starting an instance with a user's friends.

FIG. 2 illustrates an example process 200 for finding friends for game play in a new instance.

In various embodiments, Player 101 can submit a request 210 to game system 520b to play a particular instance of an online multiuser game, to play with one or more players/friends, or both. As used herein, the terms "instance," "content," "round of play," and "single play" may be used interchangeably to refer to a portion of play of an online game. For simplicity, the present disclosure refers to all such play as an "instance" herein. The instance may be discrete (e.g., a number of rounds), continuous (e.g., until the player is done for that time), constitute an entire sequence of a game (e.g., a round of playing chess), or constitute a subset of a game (e.g., playing five sequential hands of poker). Player 101 can request to play with another player/friend, explicitly (e.g., via a "Play with Buddy" option) or implicitly (e.g., via a "Play a Round" option, wherein the system finds other players automatically).

In some embodiment, the game engine can consider a variety of game play preferences provided by a player. For example, in an online poker game, the preferences may include blinds, limits, format, duration, structure of game play, etc. In an RPG, the preferences may include selecting an instance, zone of play, quest, challenge level, etc.

In response to the request, game system 520b can access Player 101's social network and analyze 220 the associated social network information to identify 230 one or more other players for Player 101 to play the instance with. In some embodiments, game system 520b will automatically identify other players for Player 101 to play with. In other embodiments, game system 520b will prompt Player 101 to choose whether he wants to find other players to play with. As used in this section, the terms "social network" may be used to refer to a player's in-game social network 160, the player's out-of-game social network 150, or both. The game system 520b can analyze Player 101's social network until sufficient friends are identified 240 for Player 101 to play with. The game system 520b can analyze other players within Player 101's social network within $N_{max}$ degrees, however optimization or user preferences may be used to limit this analysis (e.g., only analyzing first degree friends, or analyzing until enough friends are found).

In various embodiments, the content of the instance may be private to a subset of players at a given times (e.g., as in various multiuser online role-playing games). In such private instances, changes in state (e.g., movement of players, actions taken, interactions with each other or the environment) for one instance does not change the state of other instances of the same game.

Identifying Friends for Play

The game system 520b can consider a variety of factors to identify appropriate other players for Player 101 to play the instance with. These factors can be analyzed dynamically and/or algorithmically to determine which other players to present to Player 101 to play in the instance.

As appropriate, the game system 520b can perform this analysis to a predetermined depth (e.g., N-degrees deep) of the player's social network or, when computationally feasible or desired, the entire social network can be analyzed to the extent available to the game. In some embodiments, Player 101 can specifically request to only play with friends from his social network. Similarly, Player 101 can specifically request to only play with friends within a certain degree in his social network (e.g., only first or second degree friends).

In some embodiments, the system may preferentially identify those friends who have player characters of the appropriate experience, level, or power for the selected instance. For example, if Player 101 wants to play the Temple of Elemental Evil instance, the game system 520b may only identify friends at step 230 who have player characters that are 7th-level or higher. Alternatively, if Player 101 has already tried and failed to complete that instance, the game system may attempt to compensate for Player 101's lack of gaming skill and identify friends who are more powerful than it normally would, e.g., player character that are 9th-level or higher.

In some embodiments, the system can analyze Player 101's game play and Player 101's social network to make recommendations on additional friends to include in the player's social network for improved game play, for example to overcome a challenge by a more powerful player or other in-game obstacle that the system has determined has now been insurmountable long enough to reduce the player's enjoyment (and the system's ability to retain the player as a player) below some critical threshold. Continuing the previous example, if Player 101 failed to complete the Temple of Elemental Evil instance on his first try, and Player 101 does not have enough friends with 9th-level or higher characters, the game system may identify other players who have 9th-level character but who are not in Player 101's social network. Furthermore, the game system may prompt Player 101 to "add" these other players as friends and form a friend connection in Player 101's social network. This embodiment may be most useful in multiuser online games that provide a game benefit when a player has friends from his social network that are also players in the game. For example, if Player 101 is playing Zynga Mafia Wars and he has 99 friends from Facebook who are also playing Zynga Mafia Wars, these friends comprise Player 101's in-game "mob." The size of the mob provides an in-game benefit. In such games, playing with a friend may simply mean adding them to the player's mob.

In some embodiments, the analysis at step 220 may include an analysis of the social networks of Player 101's friends in some games, the size of a player's social network may provide an in-game benefit. Therefore, the game system may preferentially identify friends with larger social networks at step 230.

In some embodiments only friends that are actively playing or logged into the game are identified at step 230. In other embodiments, inactive/logged-out friends may be identified and these friends can be contacted by the system (e.g., by email, phone, SMS text, etc.) and asked to log in and join the instance. In some embodiments, the game system 520b can analyze whether friends that are logged in are busy or otherwise unavailable to join a new instance. For some games this may be trivial (e.g., in online poker, players are either in or out of a game). For other games, it may be more difficult for the system to independently determine if the friend is available or not. The game system can analyze player status updates (reported by facilities available to the player within the game, or in third-party systems with which the game operator's infrastructure may integrate), such as "away," "afk," "do not disturb," "dnd," etc., can assist the game system in analyzing which friends are available at steps 220 and 230. Similarly, other algorithms can be used, e.g., to determine if the friend is in an instance, already in a group, etc. Only available friends are selected in some embodiments. In other embodiments, friends marked as unavailable are explicitly queried by the game system 520b to check their preference to switch activities. The game system 520b can similarly assess the friend's interest, e.g., based on game play preferences that indicate how much time he has to play, content that interests him, etc. Some of these may be explicitly obtained by querying players at login while others may be implicitly determined based on past behaviors of the friend. In another embodiment, step 230 only identifies logged in, available friends who have explicitly indicated they want to join an instance.

One or more of the analyses described above can be use when determining which friends to present for play. These analyses can occur in series or parallel. The types of analyses above are provided only as examples, and one skilled in the art will also recognize that other analyses are available that could be used to identify friends who are available for play.

Presenting Friends for Play and Content

In various embodiments, once the game system 520b identifies other players for Player 101 to play with, the game system can then present these other players to Player 101 at step 250. In some embodiments, the other players are presented to Player 101 by presenting a list of the other players to Player 101, allowing Player 101 to select which other players he wants to play with. In other embodiments, the other players are automatically selected (e.g., algorithmically) by the game system 520b and presented to Player 101 without any intervention by Player 101. Once all the players are selected, the content (e.g., poker, RPG module, etc.) is presented to the assembled group for playing at step 260. In various embodiments, once the game system 520b identifies other players for Player 101 to play with, the game system can place Player 101 and the other players in an appropriate online play area at step 260.

In some instances, more than the required number of friends may be identified from the analysis of step 220. In those instances, the social graph can be used to prioritize the selected friends for the instance and/or the player can be prompted at step 250 to pick his preferred friends for this instance. However, additional online players may still be required, and steps 220 through 240 can be repeated until sufficient players are identified.

As needed or desired, the game system 520b can also analyze players outside of Player 101's social network. For example, if Player 101 wants to play an instance that requires 8 players but only 3 of his friends are available, the game system 520b may identify 5 or more other player outside of Player 101's social network to play with Player 101.

During game play, the game system 520b can monitor each player to analyze whether a sufficient number of players are still playing the instance. For example, players could log off, stop playing, or otherwise become inactive. If this happens, the game system can determine whether additional users are needed at step 270. If the game system 520b determines that more players are needed, process 300 (see FIG. 3) can be performed to find players to join an ongoing instance.

Identifying the Appropriate Number of Friends for Play

The game system 520b can consider a variety of factors to determine the number of other players it should present to Player 101 at step 250. For example, the game system 520b can consider game engine preferences (e.g., it may be preferred for an active poker game to always have eight players), game rules (e.g., a backgammon game must always have two players), player preference (e.g., a RPG player may want a party with four players), and other factors. In some embodiments, some players may be NPCs controlled by the game engine.

In some embodiments, steps 220 and 230 are performed in concert with one another. For example, Player 101 may have initiated a shootout round in Zynga Poker. The game system 520b will attempt to fill a table with 8 players, and currently Player 101 and four of his friends are sitting at the table, waiting to play. In some embodiments, the game system may take less than seven of Player 101's friends (e.g., it may start recruiting players from outside of Player 101's social network to join the instance) before initiating the instance, such that the waiting time from the request (step 210) the beginning of play (step 260) is kept short. In various embodiments, the elapsed time from step 210 to step 260 is kept below a specified duration, which can range from seconds to minutes to hours. A longer elapsed time may be acceptable if the content at step 260 is of a longer duration. For example, if a multiuser online RPG instance will take four hours, 10-15 minutes to form up a group may be more acceptable than for a one minute "attack" in another online game. In some embodiments, the game engine can dynamically determine a maximum allowed elapsed time based on the known or approximated duration of the incident.

Finding Friends for Play for an Ongoing Instance

Figure 3:
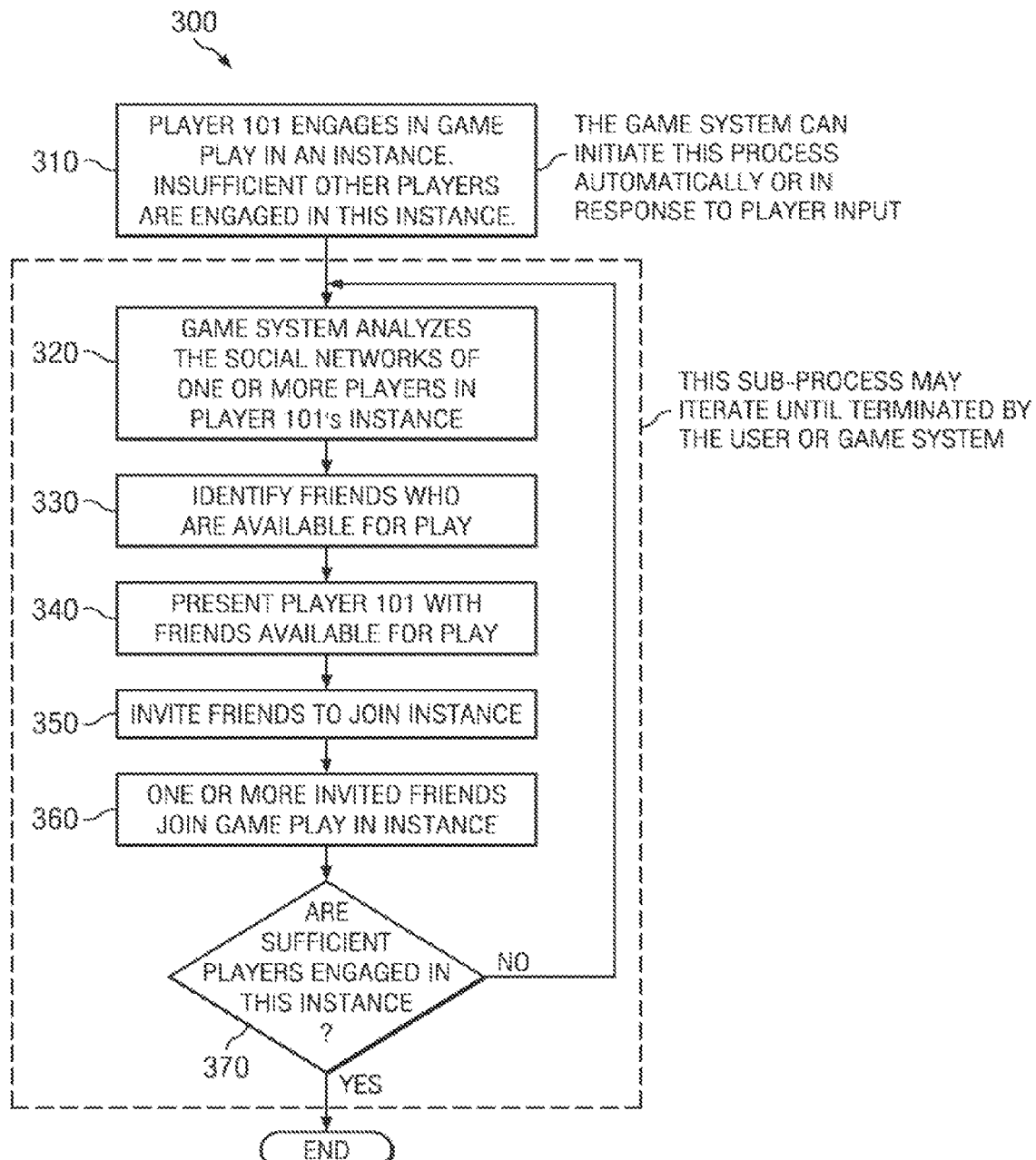
FIG. 3 shows a flowchart illustrating an example process for joining an instance with a user's friends.

FIG. 3 illustrates an example method 300 for finding friends for game play in an ongoing instance. The disclosure of analogous steps in process 200 is applicable to process 300.

While the disclosure so far has focused on the formation of a group around a player initiating an instance, various embodiments also support bringing one or more players into an instance that his friends are already playing in. This can be helpful when someone drops out of the instance in the middle of play. For example, if Player 101 and seven other people are playing online poker and one of them drops out, the game system 520b can analyze the social networks of one or more of the remaining players to find friends that can be added to fill the empty seat.

Process 300 starts with Player 101 playing an ongoing instance that has insufficient players. At step 310, it is possible either for a player in on ongoing instance to request that the game system find new players or for the game system 520b to automatically determine that it should find new players. Alternatively, a new player can request to join an ongoing instance that includes his friends. The request at step 310 may be implicit or explicit. In some embodiments, process 200 and process 300 will execute in parallel and either the player will be joined to a new game (process 200) or he will be joined to an existing game (process 300). For simplicity, process 300 will be described from the point of view of the players in the ongoing instance who are looking for other players. However, process 300 is also applicable to new players who are looking to join an ongoing instance, and all steps are analogous.

In various embodiments, the game system 520b analyzes the social graphs of one or more players in the ongoing instance at step 320. This is generally analogous to step 220, however, the analysis may vary. The game system 520b can analyze whether other players are currently available, whether the content of the ongoing instance matches other players game play preferences, whether they have player characters appropriate to play in the ongoing instance, whether they are within a certain depth of the social networks of the players in the ongoing instance, etc.

Next, the game system 520b will identify 330 which friends are available for play and present this to Player 101 and/or the other players in the ongoing instance. As with step 230, the game engine can perform a variety of analyses to identify appropriate friends that are available for play at step 330. For example, the game system can identify all friends who are available, only friends who have in-game connections 165 with at least two other players in the ongoing instance, only friends who have player characters with appropriate attributes, only friends with appropriate game player preferences, etc. if only one friend is available, the selection may be automatic. Alternatively, if one or more friends are available, then the players in the ongoing instance may be prompted to select the friend(s) they prefer to join the ongoing instance. Similarly, if a player is looking to join an ongoing instance and multiple appropriate groups are available, that player may be prompted to select the group he prefers the most.

In some embodiments, the game system 520b can include communication tools for contacting friends who are not "in game" at the time to ask them to come online and play. In one embodiment, the system can explicitly query friends that are logged into the game (e.g. "Player 101 need a friend to help him in the Temple of Elemental Evil. Join?"). In other embodiments, based on information other players provided about whether they are generally willing to play an instance, their time available to play, and their available resources, skill, etc., they may be automatically transferred to an ongoing instance to play with a particular group even if they never explicitly indicated that they were interested in that instance. For example, if Player 101 is logging into the game, he may automatically be placed in Friend $2_1$. 121's instance because Player 101 and Friend 2, 121 are friends, and Friend 2, 121, is already looking for companions.

Finally, at step 360, the friend is entered into the instance with his friends. If players log out of the game or otherwise become unavailable, process 300 can be repeated to find new players for the ongoing instance.

Poker Example: Zynga Live

Figure 4:
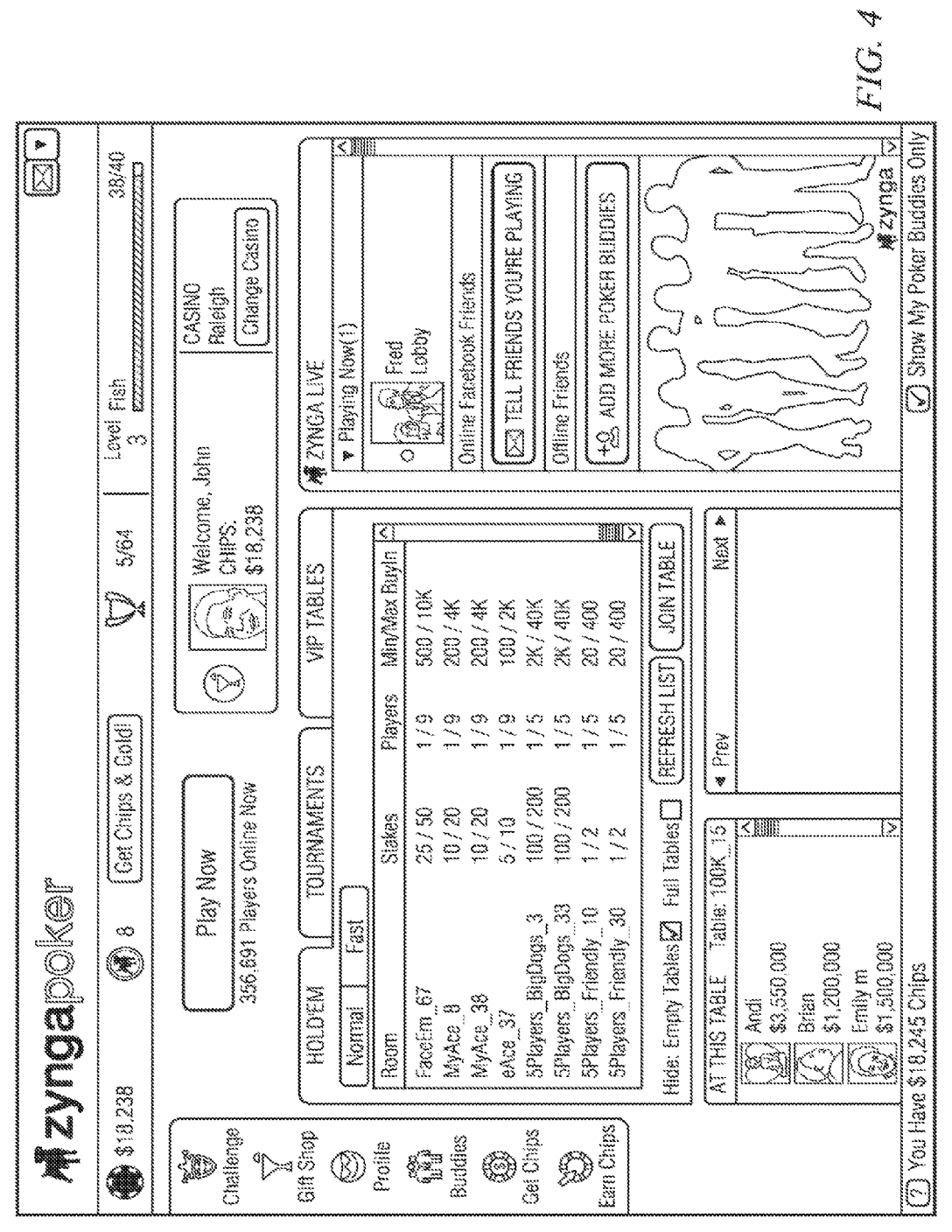

FIG. 4 illustrates an example of Zynga Poker with the Zynga Live feature for finding friends to play online poker with. Here, player John is logged into Zynga Poker and is in the game's "Lobby." In the Zynga Live display, the game system displays all the friends from John's social network who are currently also logged in. Here, John only has one other friend currently logged in, Fred. The display indicates that Fred is also currently in the "Lobby" of Zynga Poker. If Fred were currently engaged in an instance of poker, it would indicate which poker table Fred was playing at. Furthermore, John would then have the option of clicking on Fred's icon and joining that same instance of poker. If John wants to start a new poker table filled with only his friends, he could first send a message to his friends to let them know he's currently playing Zynga Poker. John could click the "Tell Friends You're Playing" button, and the game system would display a list of friends from John's social network (e.g., Facebook). He could select friends from this list, and the game system would then send a message to them, via the social networking site, informing the selected friends that John is currently playing Zynga Poker and asking them to join.

In another example, the game system 520b could have John currently playing a game and while the game is ongoing, analyze John's social network to identify his friends, determine which of those friends are available to play poker, and then invite one or more of those friend to the game by some communication means (e.g., an email or other message might pop up saying "Bob: John is currently at Table 7 in Zynga Poker and there is an empty seat. It will be fun. Can I sit you at that table with John and some of her other friends and get you started playing as soon as the next hand is dealt? Press 'Yes' and we'll do the rest.").

Systems and Methods

In the various embodiments, the computer-implemented game may be a text-based or turn-based game implemented as a series of web pages that are returned after a user selects one or more actions to perform. In other implementations, the computer-implemented game may be an animated or rendered game executable as a stand-alone application or within the context of a web page or other structured document. In one implementation, the computer-implemented game can be implemented using FLASH®-based technologies. For example, the game can be fully or partially implemented as a SWF object that is embedded in a web page and executable by a FLASH® media player plug-in. In various example embodiments, one or more described webpages may be associated with a networking system or networking service. However, alternate embodiments may have application to the retrieval and rendering of structured documents hosted by any type of network addressable resource or web site. Additionally, as used herein, a "user" may be an individual, a group, or an entity (such as a business or third party application).

Figure 5:
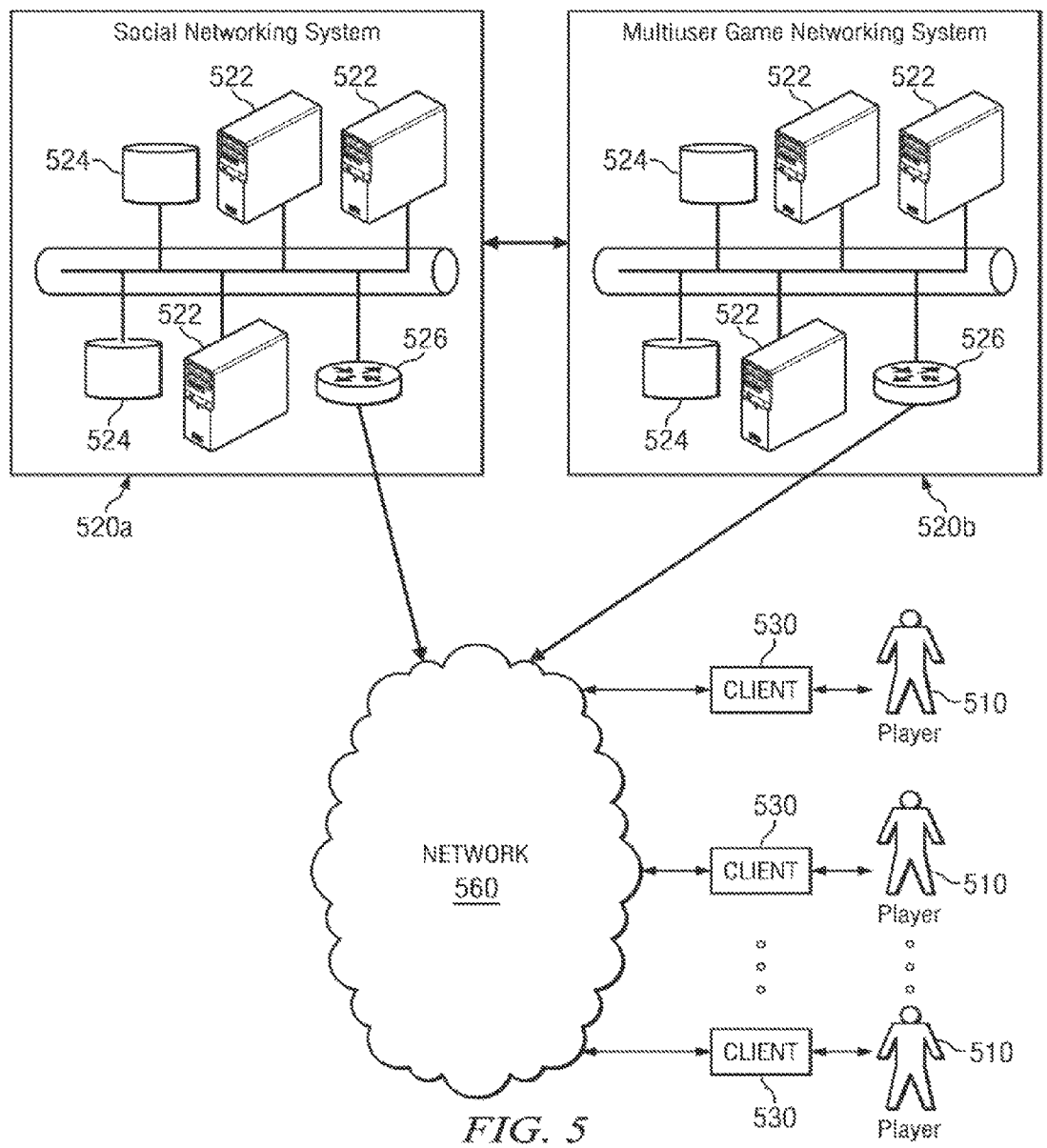
FIG. 5 illustrates an example network environment.

Particular embodiments may operate in a wide area network environment, such as the Internet, including multiple network addressable systems. FIG. 5 illustrates an example network environment, in which various example embodiments may operate. Network cloud 560 generally represents one or more interconnected networks, over which the systems and hosts described herein can communicate. Network cloud 560 may include packet-based wide area networks (such as the Internet), private networks, wireless networks, satellite networks, cellular networks, paging networks, and the like. As FIG. 5 illustrates, particular embodiments may operate in a network environment comprising social networking system 520a, multiuser game networking system 520b, and one or more client devices 530. However, a social networking system separate from the multiuser game networking system is not necessary. It is possible for the systems to be combined, such that the social networking system and the multiuser game networking system are part of the same system. Consequently, hereinafter, social networking systems 520a and multiuser game networking system 520b may be referred to simply as networking system 520. Client devices 530 are operably connected to the network environment via a network service provider, a wireless carrier, or any other suitable means.

In one example embodiment, networking system 520 comprises computing systems that allow users to communicate or otherwise interact with each other and access content, such as a multiuser online game, game player profiles, social network profiles, and other content as described herein. Networking system 520 is a network addressable system that, in various example embodiments, comprises one or more physical servers 522 and data stores 524. The one or more physical servers 522 are operably connected to computer network 560 via, by way of example, a set of routers and/or networking switches 526. In an example embodiment, the functionality hosted by the one or more physical servers 522 may include web or HTTP servers, FTP servers, as well as, without limitation, web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Flash, ActionScript, Asynchronous JavaScript and XML (MAX), and the like.

Physical servers 522 may host functionality directed to the operations of networking system 520. By way of example, networking system 520 may host a website that allows one or more users, at one or more client devices 530, to access a multiuser online game, access an online social network, as well as communicate and interact with one another via the website. Hereinafter servers 522 may be referred to as server 522, although server 522 may include numerous servers hosting, for example, networking system 520, as well as other content distribution servers, data stores, and databases. Data store 524 may store content and data relating to, and enabling, operation of the networking system as digital data objects. A data object, in particular implementations, is an item of digital information typically stored or embodied in a data file, database or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 524 corresponds to one or more of a variety of separate and integrated databases, such as relational databases and object-oriented databases, that maintain information as an integrated collection of logically related records or files stored on one or more physical systems. Structurally, data store 524 may generally include one or more of a large class of data storage and management systems. In particular embodiments, data store 524 may be implemented by any suitable physical system(s) including components, such as one or more database servers, mass storage media, media library systems, storage area networks, data storage clouds, and the like. In one example embodiment, data store 524 includes one or more servers, databases (e.g., MySQL), and/or data warehouses.

Data store 524 may include data associated with different networking system 520 users and/or client devices 530. In particular embodiments, the networking system 520 maintains a user profile for each user of the system 520. User profiles include data that describe the users of a network, which may include, for example, proper names (first, middle and last of a person, a trade name and/or company name of a business entity, etc.), biographic, demographic, and other types of descriptive information, such as work experience, educational history, hobbies or preferences, geographic location, and additional descriptive data. By way of example, user profiles may include a user's birthday, relationship status, city of residence, and the like. The system 520 may further store data describing one or more relationships between different users. The relationship information may indicate users who have similar or common work experience, group memberships, hobbies, or educational history. A user profile may also include privacy settings governing access to the user's information to other users.

Client device 530 is generally a computer or computing device including functionality for communicating (e.g., remotely) over a computer network. Client device 530 may be a desktop computer, laptop computer, personal digital assistant (PDA), in- or out-of-car navigation system, smart phone or other cellular or mobile phone, or mobile gaming device, among other suitable computing devices. Client device 530 may execute one or more client applications, such as a web browser (e.g., Microsoft Internet Explorer, Mozilla Firefox, Apple Safari, Google Chrome, and Opera, etc.), to access and view content over a computer network. In particular implementations, the client applications allow a user of client device 530 to enter addresses of specific network resources to be retrieved, such as resources hosted by networking system 520. These addresses can be Uniform Resource Locators, or URLs. In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One-prevalent markup language for creating web pages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications and other objects that can be embedded within the page. Generally, a webpage may be delivered to a client as a static document, however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

Networking system 520 may include a multitude of features with which users at remote clients 530 may interact during user sessions. In particular embodiments, these features may be implemented as web applications and may utilize JavaScript and CSS resources requested from servers 522 as well as other external servers or data stores. The web applications or resources may be embedded in various underlying or base web pages served to remote clients, such as in frames or iFrames, sections or "divs" and the like. By way of example, a computer-implemented game may be implemented as a FLASH object that is embedded into an HTML document and executable within the context of a client application, such as a browser. In one such implementation, a game hosted by game networking system 520b may be embedded into web pages served by social networking system 520a. In other implementations, game networking system 520b may serve web pages, including the embedded game application, directly to users.

In particular embodiments, the networking system 520 maintains in data store 524 a number of objects for the different kinds of items with which a user may interact while accessing networking system 520. In one example embodiment, these objects include game network user profiles, social network user profiles, application objects, and message objects (such as for wall posts, emails and other messages). In one embodiment, an object is stored by the system 520 for each instance of its associated item. These objects and the actions discussed herein are provided for illustration purposes only, and it can be appreciated that an unlimited number of variations and features can be provided on a networking system 520.

When a user at a client device (e.g., client device 530) desires to view a particular web page (hereinafter also referred to as target structured document) hosted by networking system 520, the user's web browser, or other document rendering engine or suitable client application, formulates and transmits a request to networking system 520. The request generally includes a URL or other document identifier as well as metadata or other information. By way of example, the request may include information identifying the user, such as a user ID, as well as information identifying or characterizing the web browser or operating system running on the user's client computing device 530. The request may also include location information identifying a geographic location of the user's client device or a logical network location of the user's client device. The request may also include a timestamp identifying when the request was transmitted.

Figure 6:
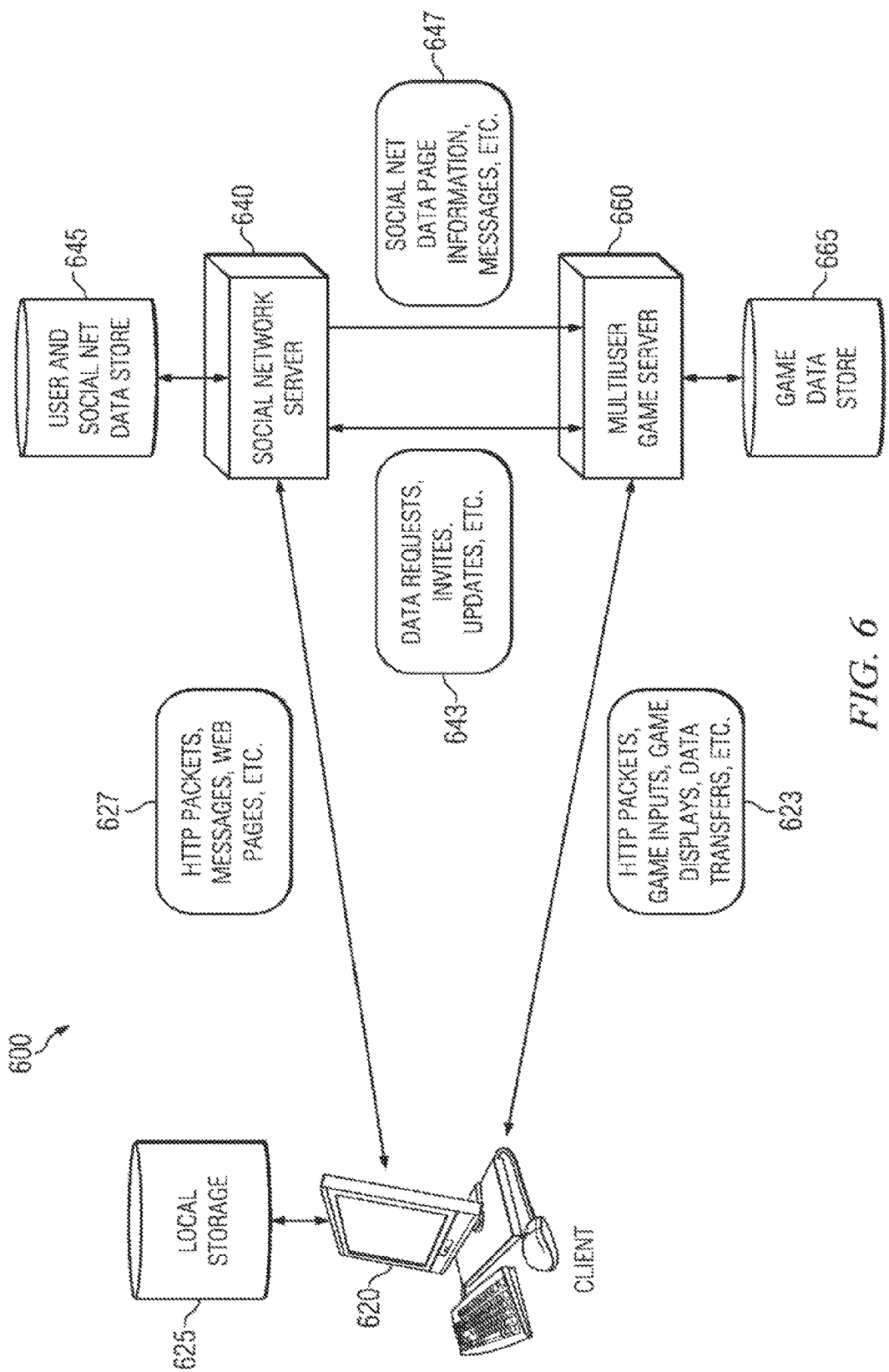
FIG. 6 depicts a schematic of a system and data flow for operating an online multiplayer game.

FIG. 6 depicts a schematic of system 600 and data flow between the components of system 600 for operating an online multiuser game. System 600 can include a client system 620, a social network server 640 and multiuser game server 660. Client system 620, social network server 640 and multiuser game server 660 can each have a corresponding data store such as local storage medium 625, user and social network storage medium 645 and game data storage medium 665, respectively. Client system 620 can communicate with social network server 640 to receive web pages, messages, etc. Additionally, client system 620 can transmit data to and receive data from 623 (including game inputs, team displays, data transfers, etc.) multiuser game server 660. In a similar fashion, multiuser game server 660 and social network server 640 can communicate HTTP packets 643 including data requests, invites, updates, etc. with social network server 640. At some other time, or at the same time, social network server 640 can communicate social network data, page info, messages, etc. data 647 with multiuser game server 660. As mentioned above, communication between client system 620, social network server 640 and multiuser game server 660 can occur over any appropriate electronic communication medium.

Figure 7:
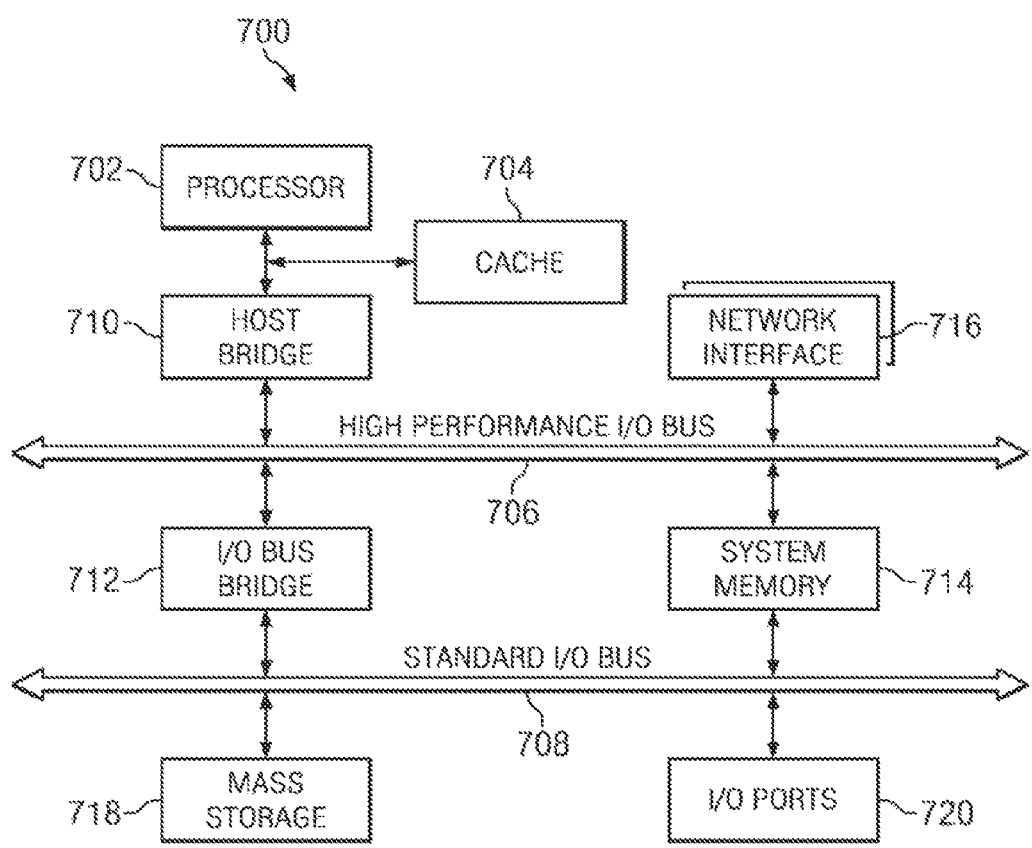
FIG. 7 illustrates an example computer system architecture.

FIG. 7 illustrates an example computing system architecture, which may be used to implement a server 522 or a client device 530 (or each node of a distributed computing system). In one embodiment, hardware system 700 comprises a processor 702, a cache memory 704, and one or more executable modules and drivers, stored on a tangible computer readable medium, directed to the functions described herein. Additionally, hardware system 700 may include a high performance input/output (I/O) bus 706 and a standard I/O bus 708. A host bridge 710 may couple processor 702 to high performance I/O bus 706, whereas I/O bus bridge 712 couples the two buses 706 and 708 to each other. A system memory 714 and one or more network/communication interfaces 716 couple to bus 706. Hardware system 700 may further include video memory (not shown) and a display device coupled to the video memory. Mass storage 718, and I/O ports 720 couple to bus 708. Hardware system 700 may optionally include a keyboard and pointing device, and a display device (not shown) coupled to bus 708. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 700 are described in greater detail below. In particular, network interface 716 provides communication between hardware system 700 and any of a wide range of networks, such as an Ethernet (e.g., IEEE 802.3) network, a backplane, etc. Mass storage 718 provides permanent storage for the data and programming instructions to perform the above-described functions implemented in the servers 522, whereas system memory 714 (e.g., DRAM) provides temporary storage for the data and programming instructions when executed by processor 802.I/O ports 720 are one or more serial and/or parallel communication ports that provide communication between additional peripheral devices, which may be coupled to hardware system 700.

Hardware system 700 may include a variety of system architectures; and various components of hardware system 700 may be rearranged. For example, cache 704 may be on-chip with processor 702. Alternatively, cache 704 and processor 702 may be packed together as a "processor module," with processor 702 being referred to as the "processor core." Furthermore, certain embodiments of the present invention may not require nor include all of the above components. For example, the peripheral devices shown coupled to standard I/O bus 708 may couple to high performance I/O bus 706. In addition, in some embodiments, only a single bus may exist, with the components of hardware system 700 being coupled to the single bus. Furthermore, hardware system 700 may include additional components, such as additional processors, storage devices, or memories.

An operating system manages and controls the operation of hardware system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the functions described herein may be implemented in firmware or on an application specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media, are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the invention.

A recitation of "a", "an," or "the" is intended to mean "one or more" unless specifically indicated to the contrary.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the processes described herein may be implemented using hardware components, software components, and/or any combination thereof. By way of example, while embodiments of the present disclosure have been described as operating in connection with a networking website, various embodiments of the present invention can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

The invention claimed is:

1. A computer-implemented method comprising:
determining, using at least one processor of a machine, whether a number of friends available to join an instance of a computer-implemented game of a player using social network information associated with the player exceeds a number of friends required for the instance of the computer-implemented game;
using a social graph from the social network information associated with the player to generate a prioritized list of friends of the player available to participate in the computer-implemented game when the number of friends available to join exceeds the number of friends required for the instance of the computer-implemented game;
identifying a player outside a social network of the player when the number of friends available to join is less than the number of friends required for the instance of the computer-implemented game;
determining, using at least one processor of a machine, a selected friend from the prioritized list of friends of the player the determining comprising: accessing player profile information associated with the player and the available friends of the player from the prioritized list; analyzing the player profile information to determine a game compatibility factor between the player and the available friends from the prioritized list of the player; and identifying a game compatible friend of the player from the prioritized list having a game compatibility factor exceeding a predetermined game compatibility threshold value; and
forming an instance of the computer-implemented game with the player and the selected friend, using the at least one processor of the machine.

2. The computer-implemented method of claim 1, wherein the determining further comprises:
presenting a list comprising the available friends to the player;
receiving a selection of a friend from the list from the player; and
generating an invitation to the selected friend to join the instance of the computer-implemented game with the player.

3. The computer-implemented method of claim 2, further comprising:
placing the player and the selected friend in an online play area corresponding to the instance of the computer-implemented game.

4. The computer-implemented method of claim 1, further comprising: automatically selecting the selected friend from the one or more available friends of the player based on a preference parameter.

5. The computer-implemented method of claim 4, further comprising:
placing the player and the at least one selected friends in an online play area corresponding to the instance of the computer-implemented game.

6. The computer-implemented method of claim 1, further comprising:
presenting the prioritized list of available friends to the player;
receiving a selection of a friend from the prioritized list from the player; and
generating an invitation to the selected friend to join the instance of the computer-implemented game with the player.

7. The computer-implemented method of claim 6, wherein the prioritized list is based on a player friend preference.

8. The computer-implemented method of claim 1, further comprising:
identifying a friend from the one or more available friends having a first degree connection with the player.

9. The computer-implemented method of claim 1, further comprising:
identifying a friend from the one or more available friends outside a first degree social network of the player.

10. The computer-implemented method of claim 1, further comprising:
monitoring the instance of the computer-implemented game with the player and the selected friend to determine an inactive player in the instance of the computer-controlled game.

11. The computer-implemented method of claim 10, further comprising:
replacing the inactive player in the instance of the computer-controlled game with another selected friend from the one or more available friends.

12. The computer-implemented method of claim 1, wherein the social network information comprises out-of-game social network information and in-game social network information.

13. The computer-implemented method of claim 1, further comprising:
presenting a list of the one or more available friends to the player from which to select the selected friend and invite to form the new instance of the computer-implemented game with the player.

14. A system comprising:
at least one processor of a machine; and
a game networking system configured to:
determine whether a number of friends available to join an instance of a computer-implemented game of a player using social network information associated with the player exceeds a number of friends required for the instance of the computer-implemented game;
use a social graph from the social network information associated with the player to generate a prioritized list of friends of the player available to participate in the computer-implemented game when the number of friends available to join exceeds the number of friends required for the instance of the computer-implemented game;
identify a player outside a social network of the player when the number of friends available to join is less than the number of friends required for the instance of the computer-implemented game
determine a selected friend from the prioritized list of friends of the player the determining comprising: accessing player profile information associated with the player and the available friends of the player from the prioritized list; analyzing the player profile information to determine a game compatibility factor between the player and the available friends from the prioritized list of the player; and identifying a game compatible friend of the player from the prioritized list having a game compatibility factor exceeding a predetermined game compatibility threshold value; and
form an instance of the computer-implemented game with the player and the selected friend.

15. The system of claim 14, wherein the game networking system is further configured to:
present a list comprising the available friends to the player;
receive a selection of a friend from the list from the player;
generate an invitation to the at least one selected friend to join the instance of the computer-implemented game with the player; and
place the player and the selected friend in an online play area corresponding to the instance of the computer-implemented game.

16. The system of claim 14, wherein the game networking system is further configured to:
automatically select the selected friend from the one or more available friends of the player based on a preference parameter; and
place the player and the selected friend in an online play area corresponding to the instance of the computer-implemented game.

17. The system of claim 14, wherein the game networking system is further configured to:
determine whether a number of available friends exceeds a number of friends required for the instance of the computer-implemented game;
generate a prioritized list of available friends when the number of available friends exceeds the number of friends required for the instance of the computer-implemented game;
present the prioritized list of available friends to the player;
receive a selection of a friend from the prioritized list from the player; and
generate an invitation to the selected friend to join the instance of the computer-implemented game with the player.

18. The system of claim 17, wherein the prioritized list is based on a player friend preference, and wherein the social network information comprises out-of-game social network information and in-game social network information.

19. The system of claim 14, wherein the game networking system is further configured to:
monitor the instance of the computer-implemented game with the player and the selected friend to determine an inactive player in the instance of the computer-controlled game; and
replace the inactive player in the instance of the computer-controlled game with another selected friend from the one or more available friends.

20. A non-transitory machine readable medium storing instructions that, when executed by at least one processor of a machine, causes the machine to perform operations comprising:
determining, using at least one processor of a machine, whether a number of friends available to join an instance of a computer-implemented game of a player using social network information associated with the player exceeds a number of friends required for the instance of the computer-implemented game;
using a social graph from the social network information associated with the player to generate a prioritized list of friends of the player available to participate in the computer-implemented game when the number of friends available to join exceeds the number of friends required for the instance of the computer-implemented game;
identifying a player outside a social network of the player when the number of friends available to join is less than the number of friends required for the instance of the computer-implemented game;
determining a selected friend, using the at least one processor of the machine, from the prioritized list of friends of the player the determining comprising: accessing player profile information associated with the player and the available friends of the player from the prioritized list; analyzing the player profile information to determine a game compatibility factor between the player and the available friends from the prioritized list of the player; and identifying a game compatible friend of the player from the prioritized list having a game compatibility factor exceeding a predetermined game compatibility threshold value; and
forming an instance of the computer-implemented game with the player and the selected friend.

21. A computer-implemented method comprising:
accessing, with at least one processor of a machine, social network information associated with a player of a computer-implemented game;
analyzing, with the at least one processor of the machine, the social network information of the player to identify one or more friends of the player; and
determining, with the at least one processor of the machine, an online presence of the one or more friends of the player to determine one or more available friends that can participate in the computer-implemented game;
using a social graph from social network information associated with the player to generate a prioritized list of friends of the player available to participate in the computer-implemented game;
identifying a player outside a social network of the player when the number of friends available to join is less than the number of friends required for the instance of the computer-implemented game;
determining a selected friend from the prioritized list of friends of the player the determining comprising:
accessing player profile information associated with the player and the available friends of the player from the prioritized list; analyzing the player profile information to determine a game compatibility factor between the player and the available friends from the prioritized lust of the player, and identifying a game compatible friend of the player from the prioritized list having a game compatibility factor exceeding a predetermined game compatibility threshold value; and
forming an instance of the computer-implemented game with the player and the selected friend, using the at least one processor of the machine.

22. The computer-implemented method of claim 21, wherein the available friends are other players of the computer-implemented game.

* * * * *

UNITED STATES PATENT AND TRADEMARK OFFICE
CERTIFICATE OF CORRECTION

Page 1 of 2

PATENT NO. : 8,449,396 B2
APPLICATION NO. : 13/244759
DATED : May 28, 2013
INVENTOR(S) : Craine et al.

It is certified that error appears in the above-identified patent and that said Letters Patent is hereby corrected as shown below:

In the Drawings

On sheet 6 of 7, fig. 6, reference numeral 645, delete "NET" and insert --NETWORK--, therefor On sheet 6 of 7, fig. 6, reference numeral 647, delete "NET" and insert --NETWORK--, therefor On sheet 6 of 7, fig. 6, reference numeral 647, delete "DATA" and insert --DATA,--, therefor In the Specification In column 1, line 53, delete "(LEG)" and insert --(LFG)--, therefor In column 3, line 54, delete "$I_N$" and insert --$1_N$--, therefor In column 4, line 55, before "some", insert --In--

In column 7, line 21, delete "friends in" and insert --friends. In--, therefor

In column 9, line 1, delete "far" and insert --for--, therefor

In column 9, line 50, delete "etc. if" and insert --etc. If--, therefor

In column 10, line 4, after "$2_1$", delete "."

In column 10, line 5, delete "2," and insert --$2_1$--, therefor

In column 10, line 5, delete "2," and insert --$2_1$--, therefor

Signed and Sealed this
Thirtieth Day of December, 2014

Michelle K. Lee
*Deputy Director of the United States Patent and Trademark Office*

CERTIFICATE OF CORRECTION (continued)

In column 10, line 20, delete "were" and insert --was--, therefor

In column 10, line 41, delete "her" and insert --his--, therefor

In column 11, line 39, delete "MAX" and insert --AJAX--, therefor

In column 12, line 53, delete "One-prevalent" and insert --One prevalent--, therefor In column 14, line 42, delete "802.1/O" and insert --702. I/O--, therefor In the Claims In column 16, line 8, in claim 1, after "using", insert --the--

In column 16, line 10, in claim 1, after "player", insert --,--

In column 16, line 40, in claim 4, after "comprising:", insert --¶--

In column 17, line 39, in claim 14, delete "game" and insert --game;--, therefor In column 18, line 54, in claim 20, after "determining", delete "a selected friend"

In column 18, line 55, in claim 20, delete "machine," and insert --machine a selected friend,--, therefor In column 18, line 56, in claim 20, after "player,", insert --,--

In column 18, line 67, in claim 20, delete "friend." and insert --friend, using the at least one processor of the machine.--, therefor In column 19, line 7, in claim 21, after "player;", delete "and"

In column 20, line 2, in claim 21, after "player", insert --,--

In column 20, line 7, in claim 21, delete "lust" and insert --list--, therefor

In column 20, line 8, in claim 21, delete "player," and insert --player;--, therefor